United States Patent [19]
Mills

[11] 3,811,376
[45] May 21, 1974

[54] AUTOMATIC FOOD HOLDING AND TURNING APPARATUS

[76] Inventor: Archie W. Mills, 2941 S. Michigan Ave., Chicago, Ill. 49007

[22] Filed: Mar. 13, 1972

[21] Appl. No.: 233,964

[52] U.S. Cl............... 99/427, 99/446, 99/450
[51] Int. Cl.............................. A47j 37/00
[58] Field of Search............ 99/427, 335, 386, 391, 99/393, 395, 409, 420, 423, 425, 426

[56] References Cited
UNITED STATES PATENTS

| | | | |
|---|---|---|---|
| 2,584,061 | 1/1952 | Stilphen | 99/427 UX |
| 2,629,313 | 2/1953 | Norville, Jr. et al. | 99/421 A |
| 3,096,707 | 7/1963 | Mills | 99/425 X |
| 3,257,935 | 6/1966 | Temperato | 99/423 X |
| 3,298,303 | 1/1967 | Waller | 99/423 |
| 3,309,982 | 3/1967 | Surks | 99/420 |
| 3,332,340 | 7/1967 | Wirtz et al. | 99/426 |

Primary Examiner—Billy J. Wilhite
Assistant Examiner—Arthur O. Henderson
Attorney, Agent, or Firm—Hill, Gross, Simpson, Van Santen, Steadman, Chiara & Simpson

[57] ABSTRACT

A barbecue rack for holding and turning foods to be cooked over a heat source, the rack having a plurality of parallel ranked U-shaped cross-section racks which are normally positioned above the fire pit at an angle of approximately 45°. The racks are pivotably mounted on slide bars with projections held in fixed pivots. The slide bars are longitudinally movable in response to an electric motor to pivot the racks approximately 90° so that the top side in one position becomes the lower side in another position. The electric motor is actuated by a timer control and turned off by a slide actuated switch.

1 Claim, 9 Drawing Figures

PATENTED MAY 21 1974 3,811,376

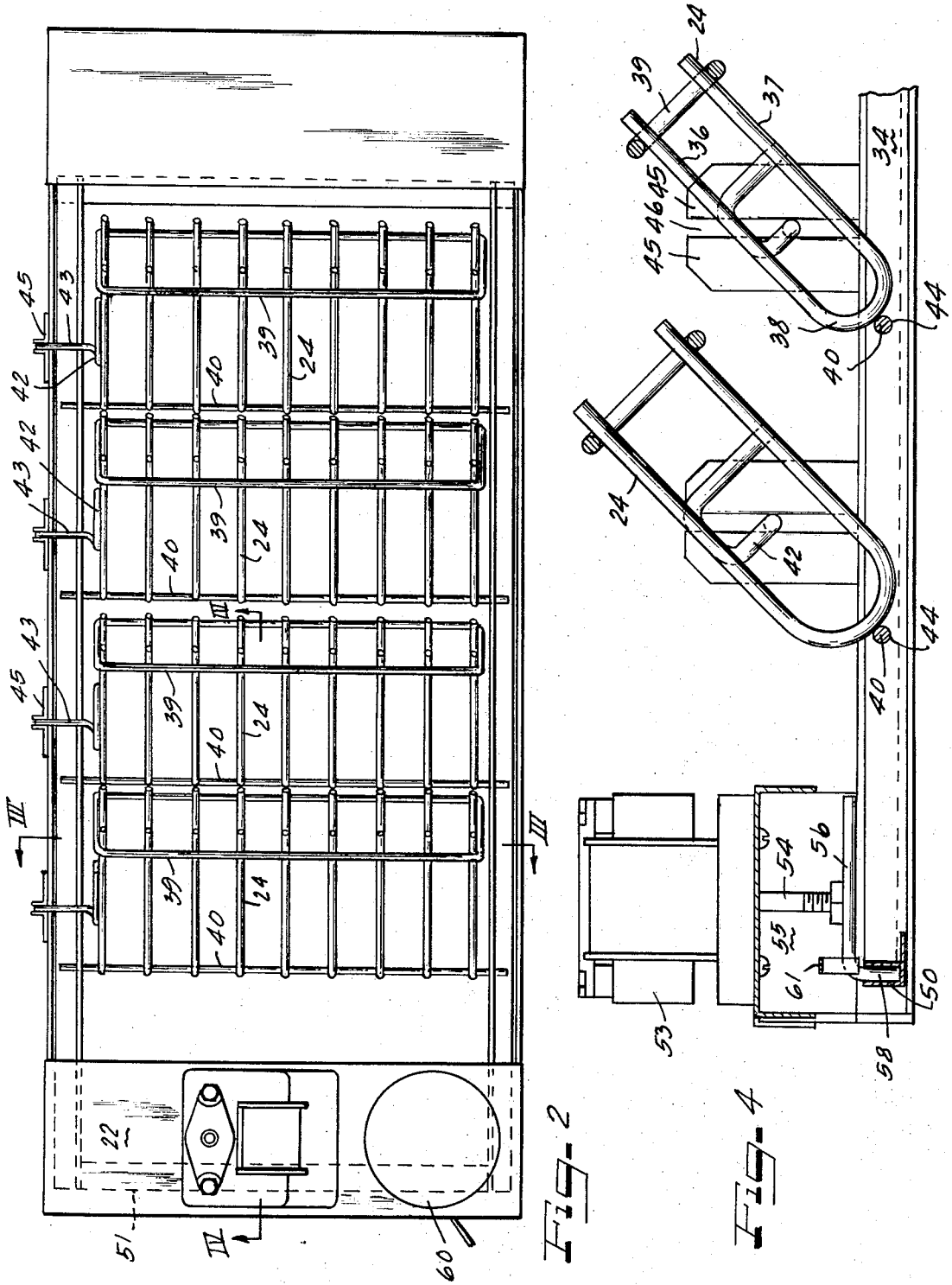

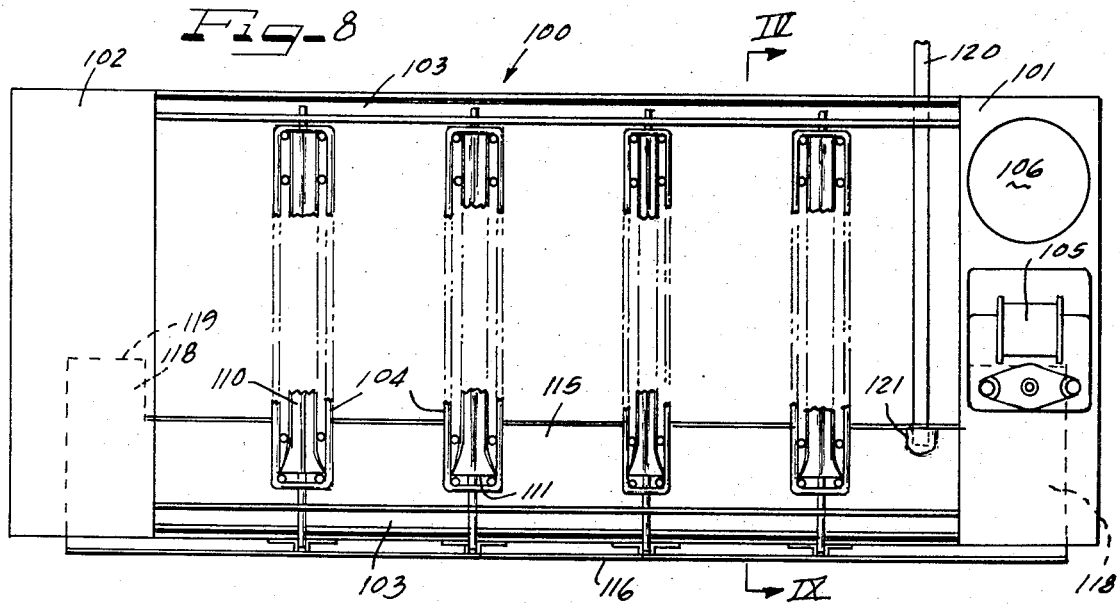
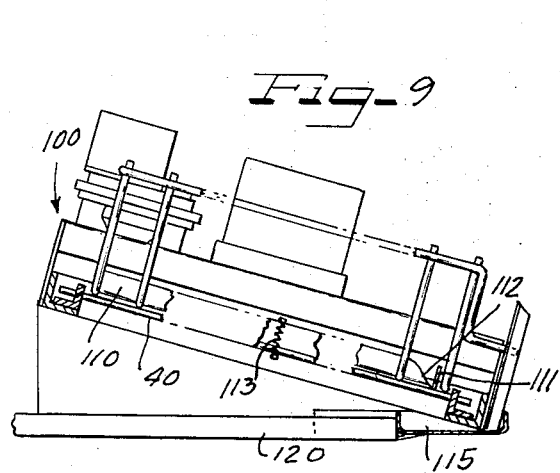
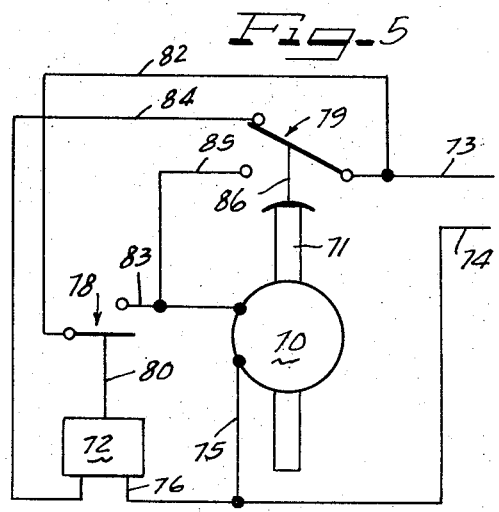
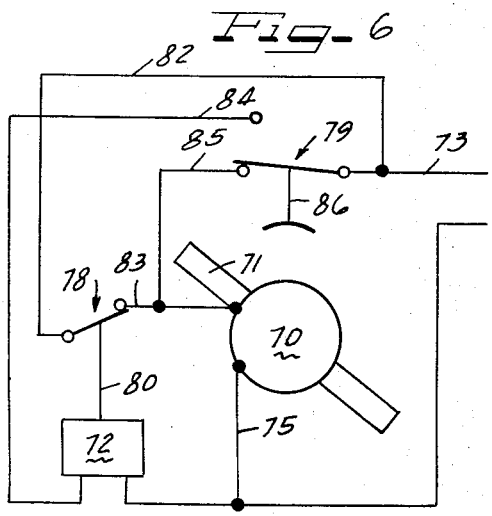
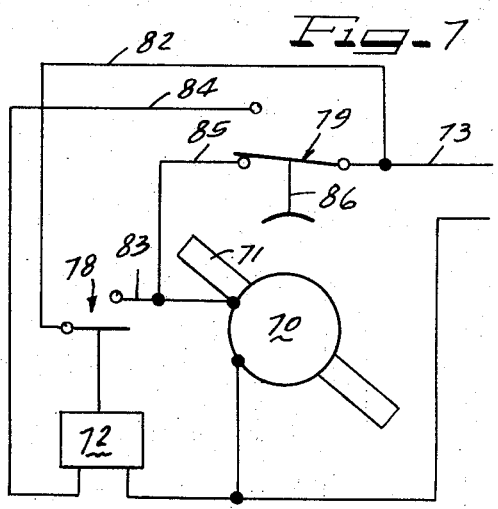

AUTOMATIC FOOD HOLDING AND TURNING APPARATUS

BACKGROUND OF THE INVENTION

1. Field of the Invention

This invention relates to a food cooking apparatus and more particularly, to an automatic food holding and turning rack.

2. Prior Art

In the cooking of foods, particularly meat, over open fires such as in barbecuing, it is common to place the meat on flat racks or grates or to suspend it above the fire and rotate it on a rotisserie apparatus. The first method requires constant attention and turning of the meat, while the second method is not readily adaptable to flat cuts of meat such as steaks, chops and ribs, and further requires complexity in assembling the meat to be cooked on the rotisserie apparatus.

It has been suggested to hold the food in parallel ranked racks which are pivotably mounted, the racks being pivotable to present opposed sides of the meat sequentially to the face of the fire. (See for example my U. S. Pat. No. 3,096,707, entitled "Food Holding and Turning Apparatus").

While such pivotable devices overcome the disadvantages of normal flat grate and rotisserie cooking, such prior devices have heretofore required human attention to actuate the pivoting of the racks. This can lead to uneven cooking of the meat, due to failure to adequately supervise the cooking and move the apparatus when necessary.

Both the prior art pivotally mounted racks and the flat racks or grates have a common disadvantage in that they require a large surface area for cooking multiple cuts of meat. Because, in either prior art embodiment, the meat to be cooked can only be placed in a level plane one layer deep, commercial establishments which prepare large quantities of such meat must have large surface areas for receipt of the food holder and equally large barbecue fire pits.

Further, once an establishment has been built, it is difficult to increase the quantity of meat which can be cooked because of the necessity of increasing both the food holding surface area and the firebox area. Therefore, such establishments are restricted in their ability to handle increased business. It would be a great advantage to the art if a method and apparatus for cooking flat pieces of meat in other than a horizontal position could be perfected. It would be a further advantage if such method and apparatus could be adaptable to existing cooking appliances.

SUMMARY

My invention overcomes the disadvantages of the prior art by providing an automatic food holding and turning device. The device of my invention incorporates a plurality of parallel-ranked food holding racks of U-shaped cross section. The racks are attached to slide bars at the bight of the "U", and projections on each rack spaced from the bight engage stationary pivot points. Therefore, as the slide bar is moved, the bight section moves from one side of the stationary pivot to the other, causing the angulation of the U-shaped racks to change.

My invention provides apparatus for the cooking of food at an angle to the face of the fire. The racks are positioned above the fire at an angle of approximately 45° to the fire. This means that the sides of the food will be presented to the fire at a 45° angle. Because of this, a greater number of racks are positionable on the turning device than would be the case if the racks were held horizontally as in the prior art. Because of the angularity of the racks, the food is presented in a more compact area, allowing the cooking of a greater amount of food than heretofore could be cooked over a given sized fire area. Movement of the slide bars moves the racks through a 90° angle so that they will project at the opposite 45° angle to the horizontal surface of the fire. Among the embodiments illustrated herein is a device which is attachable to existing fire boxes to increase the cooking efficiency of existing apparatus by increasing the amount of food which can be cooked over a given sized fire area.

The slide bars, preferably located adjacent either end of the racks and support racks, are actuated by an electric motor levered to drive the slide bars transversely of the pivot point. The electric motor is controlled by a timing device set to actuate the motor at timed intervals, such as for example at one-minute intervals. Actuation of the motor is terminated by a switch responsive to the amount of movement of the motor and the slide bars.

It is therefore an object of this invention to provide a food holding and turning apparatus for cooking, which requires a minimum amount of supervision.

It is a general object of this invention to provide apparatus for increasing the efficiency of cooking food by holding the food in a rack disposed at an angle of approximately 45° to the face of the fire.

It is another object of this invention to provide apparatus for increasing the quantity of food which can be cooked over a given-sized fire area.

It is another object of this invention to provide apparatus attachable to existing cooking devices, the apparatus holding and automatically turning food to be cooked over a fire bed, the apparatus increasing the efficiency of the cooking operation by increasing the number of food pieces which can be cooked simultaneously.

It is another object of this invention to provide an automatic food holding and turning apparatus for cooking, which automatically presents first one side then the opposite side of the food to the face of the flame in timed sequence.

It is yet another object of this invention to provide apparatus for automatically cooking of flat meat pieces on both sides with a minimum of human attention.

It is another object of this invention to improve upon the prior art by providing an automatic electrically driven food holding and turning device for cooking over barbecue flames.

It is a more specific object of this invention to provide a plurality of parallel ranked food holding racks, positionable over the open flame of a barbecue with the racks being automatically turned from an angle of approximately 45° to the level of the fire bed, through a 90° arc to the reverse angle of 45° to the fire bed.

It is another specific object of this invention to provide a food holding and turning apparatus having a frame positionable above a barbecue fire bed, the frame supporting a plurality of parallel ranked U-shaped cross-section food holding racks, the racks attached to common slide bars and pivotably mounted to stationary portions of the frame, the slide bars being electrically driven at timed intervals to reposition the racks to expose opposite sides of rack-held food to the face of the flame.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 2, on page 2, is a top plan view of a food holding and turning rack according to this invention.

FIG. 4, on page 2 of the drawings, is a fragmentary cross-sectional view of the food holding and turning apparatus of FIG. 2 taken along the lines IV—IV of FIG. 2.

FIGS. 5, 6 and 7 are schematic drawings illustrating a motor timing control for providing dwell times at opposed 45° angles for the food racks.

FIG. 8 is a top plan view of a modified form of this invention providing automatic grease drainage.

FIG. 9 is a cross-sectional view of the embodiment of FIG. 8 taken along the lines IX—IX of FIG. 8.

DESCRIPTION OF THE PREFERRED EMBODIMENTS

Figure 1:
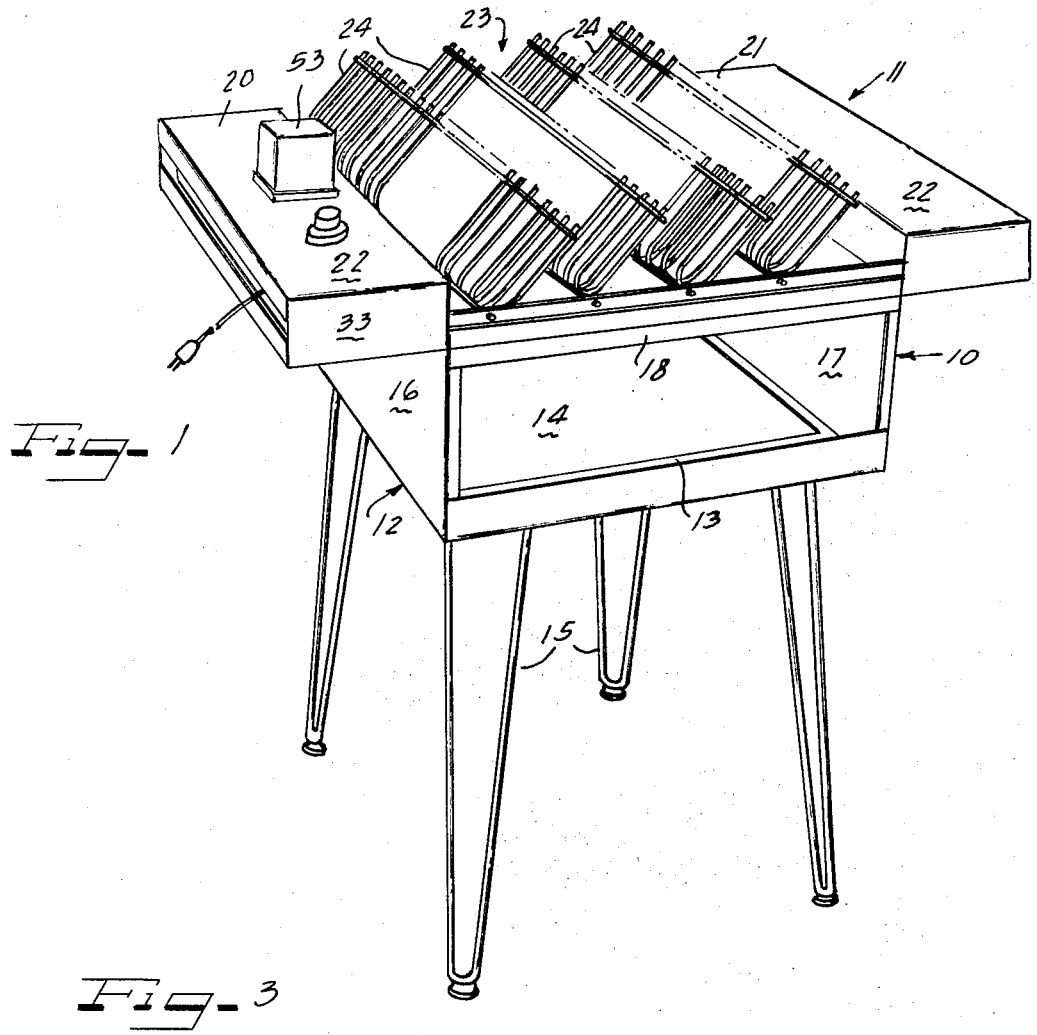
FIG. 1 is a perspective view of a barbecue equipped with the food holding and turning apparatus of this invention.

FIG. 1 is a perspective view of a barbecue fire pit 10 equipped with food holding and turning apparatus 11 of this invention. The pit 10 comprises a box 12 with an open end 13, open to the interior where a fire supporting floor or grate 14 is provided. The box may be supported on legs 15. The box 12 has side walls 16 and 17, which support an open rectilinear top 18.

The food holding and turning apparatus 11 is positioned on top of the rectilinear top 18 and may be attached thereto by any suitable means including bolts, welding, and the like fastening methods.

It will, of course, be understood that although the food holding and turning apparatus 11 is illustrated as positioned atop a fire box 10, that the apparatus is designed to be used either as a separate unit adaptable to pre-existing barbecue burner equipment, or as an attachable or integral unit for use with new equipment.

The apparatus 11 is generally rectangular in shape and includes end portions 20 and 21 which are covered as at 22 to provide shelves spaced apart by the food holding section 23. The food holding section consists of a plurality of racks 24, four of which are illustrated in FIG. 1. It will, however, be understood that a greater or lesser number of racks may be utilized.

Figure 3:
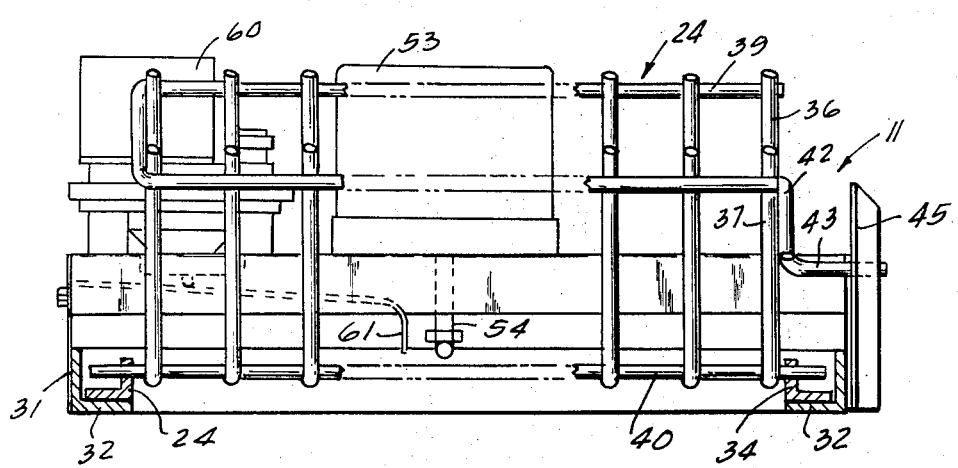
FIG. 3, on page 1, is a view of the food holding and turning apparatus of FIG. 2, taken along the lines III—III of FIG. 2.

As best shown in FIGS. 2, 3 and 4, the food holding and turning apparatus 11 includes a frame 31, having L-shaped cross-section frame members in opposed relation forming the sides 32. The members extend into the end pieces 20 and 21 to the ends thereof. The members 32 are attached to the side walls 33 of the end portions 20 and 21 to form a rigid rectangular frame. Slide bars 34 are positioned atop the bottom leg of the members 32 and are slidable longitudinally thereof in a manner hereinafter described.

As best illustrated in FIG. 4, the racks 24 are generally constructed of wire and are U-shaped, having parallel legs 36 and 37 interconnected by a bight portion 38. A series of U-shaped wire pieces are assembled together by a frame wire 39 positioned adjacent the free ends of the legs 36 and 37 and by a pivot wire 40 attached to the bights 38 at the bottom thereof exterior of the "U". The wire 39 and the wire 40 may be attached to the U-shaped wires by welding, brazing or the like fastening means.

A stationary pivot wire 42 is attached to the resultant rack adjacent one end thereof, as best illustrated in FIGS. 2 and 3. The pivot wire 42 has a projection 43 which extends beyond the rack. The bight wire 40 also extends beyond the rack at both ends of the rack.

The slide bars 34 have a number of openings 44 therethrough, in spaced-apart relation. The openings receive the bight wires 40 in pivotable relation, thereby securing the rack to the slide bars on either side of the frame. Thus, when the slide bars are moved on the frame members 32, the bight wires 40 will move therealongwith, causing the racks to move. The stationary pivot wire extensions 43 are received in frame-carried stationary pivot members 45, which have vertical gaps 46 therein, which receive the projection 43. Thus, when the slide bars 34 are moved, carrying the racks therealongwith, lateral movement of the racks is prevented by the indexing between the stationary pivot wire 42 and the members 45. This forces the racks to undergo a rotary or tilting movement. By limiting the travel of the slide bars to a given distance in either direction, my invention can be constructed so that with the slide bars at the limits, the racks project at an angle of approximately 45° to the frame, as illustrated in FIG. 4. By then sliding the bars to the opposite limit, the racks will be caused to rotate, pivoting around the bight wire 40 in the openings 44 and the stationary pivot wire 42 in the slot 46, to the opposed 45° angle from that illustrated in FIG. 4. Thus, the racks travel only through a 90° angle in my preferred embodiment.

However, by constructing my device in this manner, the normal operating positions of the racks are limited from a right 45° angle through vertical to the opposed left 45° angle to the frame. In this manner, a greater number of racks may be positioned above a given-sized area than would be the case if the racks were positioned horizontally, as is common in the prior art. This allows for economies in the design and operation of food cooking establishments.

In order to provide for movement of the slide bars 34, the slide bars at the opposite sides of the frame are attached together at one end by a drive member 50. As illustrated in FIG. 4, the drive member may be a U-shaped piece of metal which is attached to both of the slide bars and extends across the width of the frame, as indicated by the dotted lines 51 in FIG. 2. A geared motor 53 is positioned atop the end portion 22 and has a driven axle 54 projecting into the space 55 below the end portion 22 and above the slide bars 23 and driving member 50. The drive shaft 54 is attached to an angle rod 56 which is linked to the drive member 50. Thus, as the gear motor 53 revolves the angle rod 56, the drive member 50 will be moved. By providing a U-shaped drive member 50, the angle rod 56 may project thereinto and be free to move along the length of the U-shaped drive member 50 while carrying the drive member with it as it moves longitudinally of the frame. Thus, a reciprocal motion is imparted to the slide bars 34 the distance of which is equal to the diameter of a circle inscribed by the movement of the leg 58 of the angle rod 56.

Thus, my invention provides for a device for cooking food, such as meat pieces, at a desired angle, preferably 45°, to the face of a flame, the food being held in racks which are automatically pivoted from an acute angle of 45° to an obtuse angle of 45° approximately, the racks pivoting through approximately 90°.

While my device will work as hereinabove described, in my preferred embodiment, I have attached a timing device 60 to the end portion 22 in operative connection with the gear motor 53. The timing device is chosen from among those devices which provide intermittent operation. Thus, in the preferred embodiment, the timing device will actuate the motor intermittently, such as once every minute. A limit switch 61 is provided to be struck by the angle rod 56 so as to terminate actuation of the motor each time the angle rod 56 has moved 180°. This will effectively move the racks 24 from the acute angle to the obtuse angle, or vice-versa, and terminate movement at that point. The timer will then wait a period of time before reactuating the motor which will again drive the angle rod 56 through approximately 180°, striking the limit switch 61 to disengage the motor. Thus, a dwell time is provided at the 45° angle positions.

The timing device may be any of several types commercially available, and I have illustrated in FIGS. 5, 6 and 7 a simplified schematic for attaching such a timing device. In FIGS. 5, 6 and 7, the motor is indicated at 70 with a driven projection such as the angle rod 56 being illustrated at 71. The timer is illustrated at 72. Electrical lines 73 and 74 are connected to an outside electrical source. The line 74 is attached through line 75 to the motor and through line 76 to the timer 72. Switches 78 and 79 actuate the timer and motor. Switch 78 is mechanically linked as at 80 to the timer 72 and is actuated thereby to close the switch into contact between line 82 connected to line 73 and line 83 connected to motor 70.

Switch 79 is a double-pole switch, capable of connecting either line 84 to line 73 or line 85 to line 73. Line 84 is in turn connected to timer 72 and line 85 is in turn connected to line 83, which is connected to the motor 70. Switch 79 is of the type which is normally closed in contact with line 85. However, switch 79 has a striker 86 associated therewith which is adapted to be struck by the projection 71 of the motor 70 to close switch 79 into contact with line 84. When switch 79 is closed into contact with line 84 as illustrated in FIG. 5, the timer 72 will be actuated. Prior to the time the timer reaches the end of its set period, switch 78 is normally open. When the timer reaches the end of its set period, as illustrated in FIG. 6, the mechanical linkage 80 closes switch 78, thereby completing a circuit through the motor consisting of lines 73, 82, switch 78, line 83, the motor, line 75 and line 74. This will actuate the motor 70 to move the projection 71 off of the switch actuator 86, thereby breaking the connection between line 73 and line 84 to the timer 72 and opening a connection between line 73 and line 85 to the motor. This will continue rotation of the motor, while terminating actuation of the timer. Upon termination of actuation of the timer, as illustrated in FIG. 7, switch 78 will open, breaking contact between line 82 and line 83. At this point, the motor's circuit is closed due to the switch 79 being in contact with line 85. However, as the motor continues to rotate, the projection 71 will again contact the striker 86, opening switch 79 into contact with line 84. This will break the circuit to the motor, while actuating the circuit to the timer. The timer will again run through its pre-timed operation and close the switch 78.

Therefore, a switch and motor circuit such as is illustrated will effectively oscillate the racks 24 of my invention intermittently to present first one side and then the other side of meat to be cooked to the face of the flame at an angle thereto. It is to be understood that the circuit illustrated in FIGS. 5 through 7 presents but one embodiment of a circuit capable of operating the device of my invention according to the herein teachings.

FIGS. 8 and 9 illustrate a modified form of my invention providing grease control. A food holding and turning rack 100 is illustrated, having end lands 101 and 102 interconnected by a frame supporting slide bars 103 which receive and actuate the racks 104 and which is driven by a motor 105, timed by a timer 106 in accordance with the teachings of my previous embodiment.

The racks 104 have liner troughs 110 positioned in the interior of the bight section. The liner troughs extend from one end of the racks 104 to the other, and have an end wall 111 at one end thereof, the end wall blocking the liner except through a lip 112, positioned adjacent the end wall. The lip 112 is formable as a result of bending the end 111 upwardly. A spring 113 received around the grease trough 110 and the bight rod 40 holds the trough 110 in position.

In order to receive the drippings from the troughs, a tray 115 is positioned under the main frame of the apparatus 100, adjacent the side of the frame 116 which is closest to the pouring lips 112 of the troughs 110. The tray 115 extends only partially across the width of the frame, so as to be positioned under the lips 112. The tray has end extensions 118 which are wider, so as to allow their back walls 119 to clear the underside of the end lands 101, 102 of the food holding and turning apparatus 100.

In order to provide for receipt of the tray as well as to provide for definite drainage of the grease in the troughs 110, the food holding and turning apparatus 100 is preferably angled with respect to the tray 115 as is illustrated in FIG. 9. A drainage pipe 120 is operatively connected to the tray as at 121 to carry off the drippings to an area away from the apparatus 100.

It can therefore be seen from the above that my invention provides a food holding and turning apparatus comprising a plurality of parallel ranked frame-supported U-shaped cross-section food holding racks, the racks being positioned at an angle of approximately 45° to the face of the flame above which the frame is positioned. A timer-controlled motor and driving apparatus is illustrated to pivot the racks through approximately a 90° angle to present alternatively one side and then the other of the food received in the racks to the face of the flame. The angularity of the racks to the face of the flame increases the amount of food which can be cooked over a given area without adversely affecting the quality of the cooking.

Although the teachings of my invention have herein been discussed with reference to specific theories and embodiments, and although illustrative means for accomplishing explained results have been described, it is to be understood that these are by way of illustration only and that others may wish to utilize my invention in different designs or applications.

I claim as my invention:

1. A food holding and turning apparatus comprising: a frame, said frame having spaced-apart side members, a plurality of parallel-ranked food holding racks spanning the distance between the side members, said racks pivotably connected to said frame, said racks being pivotable between an acute angle of approximately 45° and an obtuse angle of approximately 45° to a base plane, said base plane being a plane extending between the side members, said racks being of U-shaped cross section and means for pivoting said racks, the frame adapted to be positioned above a heat source below the base plane, the space between the legs of the U-shaped racks adapted to receive food whereby the apparatus is effective to present opposite sides of the food in the racks to the heat source at an angle, said side members of said frame including slide bars, said slide bars movable by means longitudinally of the frame, said racks having projections extending therefrom adjacent the bights of the U's, the said projections pivotably connected to the said slide bars, said rack having second projections extending therefrom, said second projections spaced from the said bights, said second projections pivotably connected to said second projections pivotably connected to stationary portions of said frame whereby movement of the slide bars will move the bight sections of the racks longitudinally of the frame while said second projections and said stationary portions cooperate to maintain other portions of the racks stationary with respect to the frame except for rotation thereof, said movement of the slide bar causing the racks to tilt with respect to the base plane, and grease collection means for collecting and draining off drippings from food held in said racks, said grease collection means including liner troughs positioned in the bights of the U's, the troughs emptying at one end thereof to a tray positioned on an angle to the horizontal.

* * * * *